(12) United States Patent
Ji

(10) Patent No.: US 12,310,515 B1
(45) Date of Patent: May 27, 2025

(54) ARTICLE COUNTING AND PROPELLING APPARATUS

(71) Applicant: Guangdong Hanmo Technology Co., Ltd, Dongguan (CN)

(72) Inventor: Yanfei Ji, Dongguan (CN)

(73) Assignee: Guangdong Hanmo Technology Co, Ltd, Dongguan (CN)

( * ) Notice: Subject to any disclaimer, the term of this patent is extended or adjusted under 35 U.S.C. 154(b) by 0 days.

(21) Appl. No.: 19/066,224

(22) Filed: Feb. 28, 2025

(30) Foreign Application Priority Data

Dec. 16, 2024 (CN) .......................... 202423115146.9

(51) Int. Cl.
 *A47F 1/12* (2006.01)
 *A47F 7/00* (2006.01)
 *G05B 15/02* (2006.01)

(52) U.S. Cl.
 CPC ............ *A47F 1/125* (2013.01); *A47F 7/0007* (2013.01); *G05B 15/02* (2013.01)

(58) Field of Classification Search
 CPC ....... A47F 1/125; A47F 7/0007; G05B 15/02; G06Q 10/087; G07F 11/20
 USPC ........... 211/59.3; 700/236; 221/15, 270, 279
 See application file for complete search history.

(56) References Cited

U.S. PATENT DOCUMENTS

| | | | | |
|---|---|---|---|---|
| 5,460,294 A * | 10/1995 | Williams | ................ | G07F 11/42 221/256 |
| 5,753,897 A * | 5/1998 | Kasper | ..................... | B65H 1/06 235/475 |
| 6,515,590 B1 * | 2/2003 | Lauria | ...................... | H04R 1/02 211/59.3 |
| 7,792,711 B2 * | 9/2010 | Swafford, Jr. | ........ | G06Q 10/087 705/28 |
| 8,190,289 B2 * | 5/2012 | Lockwood | .............. | G07F 17/10 221/3 |
| 10,172,482 B2 * | 1/2019 | Pritchard | ................ | A47F 1/126 |
| 10,398,238 B2 * | 9/2019 | Obitts | ..................... | A47F 1/125 |
| 10,614,415 B1 * | 4/2020 | De Bonet | ............ | A47B 96/028 |
| 11,412,863 B2 * | 8/2022 | Grant | ..................... | A47F 3/002 |
| 12,004,664 B2 * | 6/2024 | Campbell | ............... | G07F 11/60 |
| 2005/0279722 A1 * | 12/2005 | Ali | ......................... | A47F 10/00 211/59.3 |
| 2009/0261118 A1 * | 10/2009 | Katritzky | ................. | B65G 1/08 221/124 |
| 2014/0043162 A1 * | 2/2014 | Siciliano | ................. | G07F 9/026 340/568.8 |
| 2014/0104826 A1 * | 4/2014 | Bergdoll | ................. | A47F 5/103 211/59.3 |
| 2017/0172315 A1 * | 6/2017 | Hay | ........................ | A47F 10/02 |
| 2024/0130539 A1 * | 4/2024 | Schwarz | ................... | A47F 1/12 |

* cited by examiner

*Primary Examiner* — Jennifer E. Novosad
(74) *Attorney, Agent, or Firm* — Nicholas Makridakis

(57) ABSTRACT

An article counting and propelling device, including a base, a propelling plate and a counting structure. The counting structure is located at one end of the base and controls the propelling plate to slide and push along the base. The counting structure includes a shell, a cover body, a PCB board, a runner assembly and counting sensing pieces. The runner assembly is connected to the propelling plate through a wire. The counting sensor (grating or magnetic grating sensor) is installed on the PCB board and located above or on both sides of the runner assembly. The cover body closes an accommodating groove and displays the number of the remaining articles on it.

6 Claims, 6 Drawing Sheets

ND PROPELLING
ARTICLE COUNTING AND PROPELLING APPARATUS

TECHNICAL FIELD

The utility model relates to the related technical field of article counting devices, and in particular to an article counting and propelling apparatus.

BACKGROUND

An article propelling apparatus is a display apparatus applied to convenience stores, vending machines and other retail shelves. When articles are out of store or delivered, the articles can be replenished or pushed out, which is convenient for consumers to take. At present, for the articles on the article propelling apparatus, only the articles at the front end can be observed, and it is impossible to accurately know how many articles are left at the back end, so that the articles cannot be supplemented in time. How to count the articles accurately and know how many articles have been delivered and left is a technical problem to be solved at present.

SUMMARY

A main objective of the utility model is to overcome the above defects and shortcomings in the prior art and provide an article counting and propelling apparatus.

An article counting and propelling apparatus includes a base, a propelling plate and a counting structure. The counting structure is arranged at an end of the base, the propelling plate is movably arranged on the base, and the counting structure controls the propelling plate to slide and push along the base. The counting structure includes a shell, a cover body, a PCB board, a runner assembly and counting sensing pieces; the runner assembly is arranged on the shell and is connected to the propelling plate through a wire; the base is provided with an accommodating groove; the runner assembly and the shell are arranged in the accommodating groove; the counting sensing pieces are arranged on the PCB board; the PCB board and the cover body is arranged above the accommodating groove; the cover body closes the accommodating groove; the counting sensing pieces are arranged above or on two sides of the runner assembly; and the counting sensing pieces are grating sensors or magnetic grating sensors.

According to the utility model, the propelling plate is controlled by the counting structure to slide and push articles along the base, and the number of the remaining articles can be sensed and counted by the counting sensing pieces, so that the number of the remaining articles can be displayed on the cover body at an upper end of the counting structure in time. The counting structure of the utility model is simple, convenient to operate and display, and convenient to visually see the number of the remaining articles.

In an implementation manner of one of the embodiments, the counting sensing pieces are the grating sensors, the counting sensing pieces are arranged on two sides of the runner assembly, and the runner assembly passes through the grating sensor when rotating.

In an implementation manner of one of the embodiments, the counting sensing pieces are the magnetic grating sensors, a plurality of magnetic pieces are arranged on the runner assembly, the counting sensing pieces are arranged above the runner assembly, and the runner assembly passes through the magnetic grating sensors above when rotating.

In an implementation manner of one of the embodiments, a display board is arranged on the cover body, and the display board is connected to the PCB board.

In an implementation manner of one of the embodiments, a buckle is arranged on the cover body, a groove wall of the accommodating groove is provided with a clamping hole, and the buckle is inserted into the clamping hole when the cover body is arranged on the base.

In an implementation manner of one of the embodiments, a plurality of mounting columns are arranged in the accommodating groove, and the PCB board is fixed on the mounting columns.

The utility model has the following beneficial effects: the propelling plate is controlled by the counting structure to slide and push articles along the base, and the number of the remaining articles can be sensed and counted by the counting sensing pieces, so that the number of the remaining articles can be displayed on the cover body at an upper end of the counting structure in time. The counting structure of the utility model is simple, convenient to operate and display, and convenient to visually see the number of the remaining articles.

DETAILED DESCRIPTION OF THE EMBODIMENTS

Figure 1:
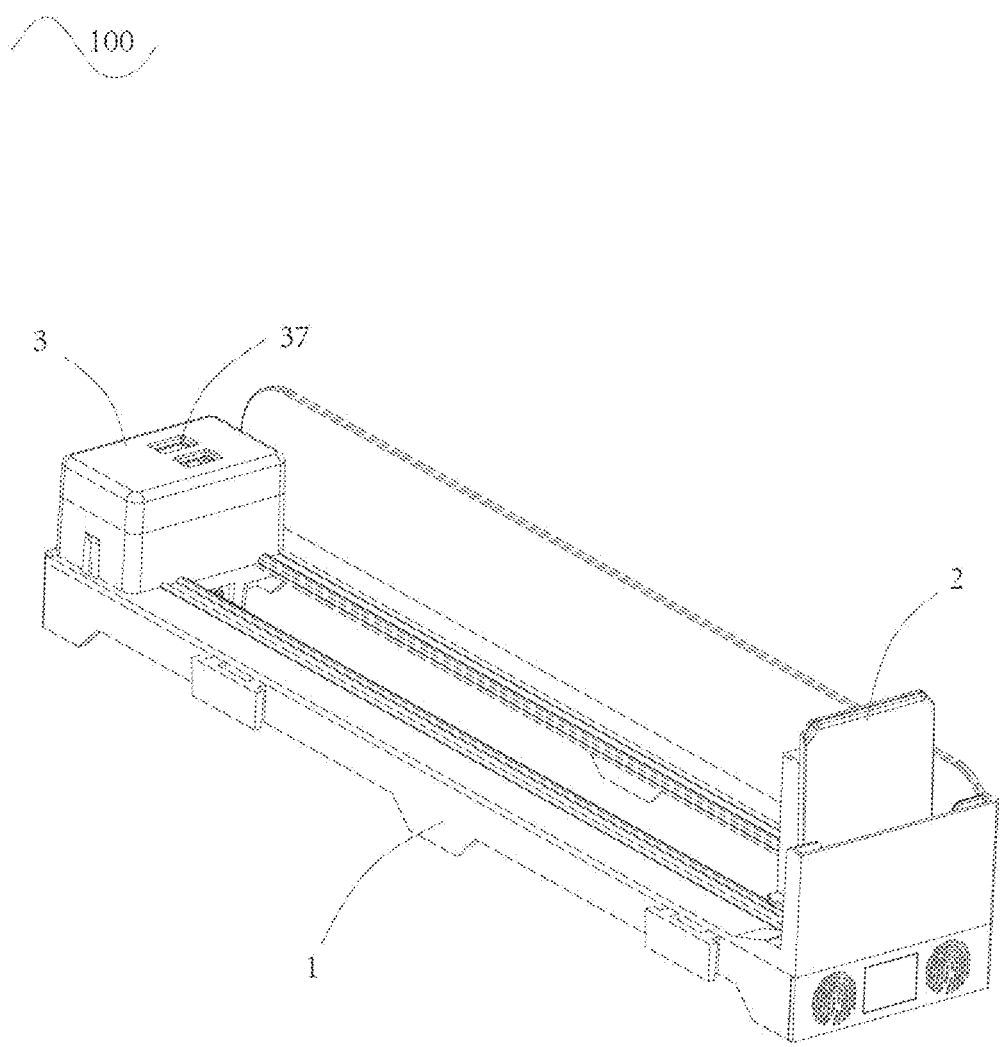
FIG. 1 is a schematic structural diagram of an article counting and propelling apparatus according to Embodiment 1 of the utility model.

The embodiments of the utility model are described below in detail. Examples of the embodiments are shown in the accompanying drawings. The same or similar reference numerals represent the same or similar elements or elements having the same or similar functions throughout the specification. The embodiments described below with reference to the accompanying drawings are exemplary, and are only used to explain the utility model, but should not be construed as a limitation to the utility model.

It should be understood that, in the description of the utility model, orientation or position relationships indicated by the terms such as "center", "longitudinal", "transverse", "length", "width", "thickness", "upper", "lower", "front", "back", "left", "right", "vertical", "horizontal", "top", "bottom", "inner", "outer", "clockwise", "anticlockwise", "axial", "radial" and "circumferential" are orientation or position relationships shown in the drawings. These terms are merely intended to facilitate a simple description of the utility model, rather than to indicate or imply that the mentioned apparatus or elements must have the specific orientation or be constructed and operated in the specific orientation. Therefore, these terms may not be construed as a limitation to the utility model.

In addition, terms "first" and "second" are used merely for description, and shall not be construed as indicating or implying relative importance or implicitly indicating a quantity of indicated technical features. Thus, the features defined with "first" and "second" may explicitly or implicitly include one or more of the features. In the description of the utility model, "a plurality of" means two or more, unless otherwise specifically defined.

In the utility model, unless otherwise clearly specified, the terms "mount", "connected", "connection", "fixation" and the like are intended to be understood in a broad sense. For example, the "connection" may be a fixed connection, removable connection or integral connection; may be a mechanical connection or electrical connection; may be a direct connection or indirect connection through a medium; and may be a communication or interaction between two elements. Those of ordinary skill in the art can understand specific meanings of the terms in the utility model according to specific situations.

In the utility model, unless otherwise explicitly specified or defined, a first feature being "above" or "below" a second feature may refer to the first and second features being in direct contact or the first and second features being in indirect contact through an intermediary. In addition, the first feature being "above", "over", or "on" the second feature may refer to the first feature being over or above the second feature, or may merely indicate that the horizontal position of the first feature is higher than that of the second feature. The first feature being "under", "below" or "beneath" the second feature may refer to the first feature being under or below the second feature or may merely indicate that the horizontal position of the first feature is less than that of the second feature.

The utility model provides an article counting and propelling apparatus, including a base, a propelling plate and a counting structure. The counting structure is arranged at an end of the base, the propelling plate is movably arranged on the base, and the counting structure controls the propelling plate to slide and push along the base. The counting structure includes a shell, a cover body, a PCB board, a runner assembly and counting sensing pieces; the runner assembly is arranged on the shell and is connected to the propelling plate through a wire; the base is provided with an accommodating groove; the runner assembly and the shell are arranged in the accommodating groove; the counting sensing pieces are arranged on the PCB board; the PCB board and the cover body is arranged above the accommodating groove; the cover body closes the accommodating groove; the counting sensing pieces are arranged above or on two sides of the runner assembly; and the counting sensing pieces are grating sensors or magnetic grating sensors.

According to the utility model, the propelling plate is controlled by the counting structure to slide and push articles along the base, and the number of the remaining articles can be sensed and counted by the counting sensing pieces, so that the number of the remaining articles can be displayed on the cover body at an upper end of the counting structure in time. The counting structure of the utility model is simple, convenient to operate and display, and convenient to visually see the number of the remaining articles.

Embodiment 1

Figure 2:
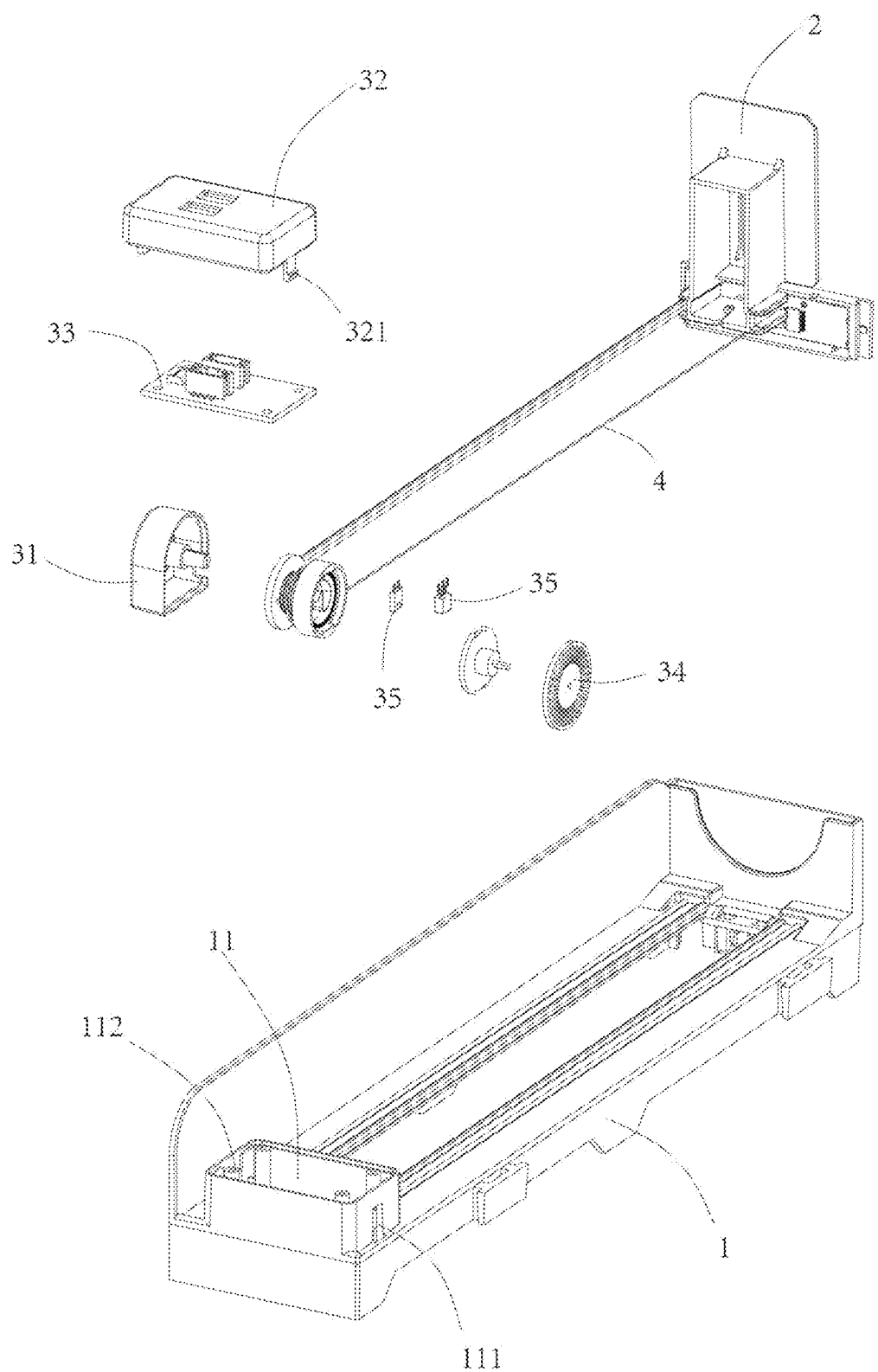
FIG. 2 is a schematic diagram of a breakdown structure of the article counting and propelling apparatus according to the utility model in FIG. 1.
Figure 3:
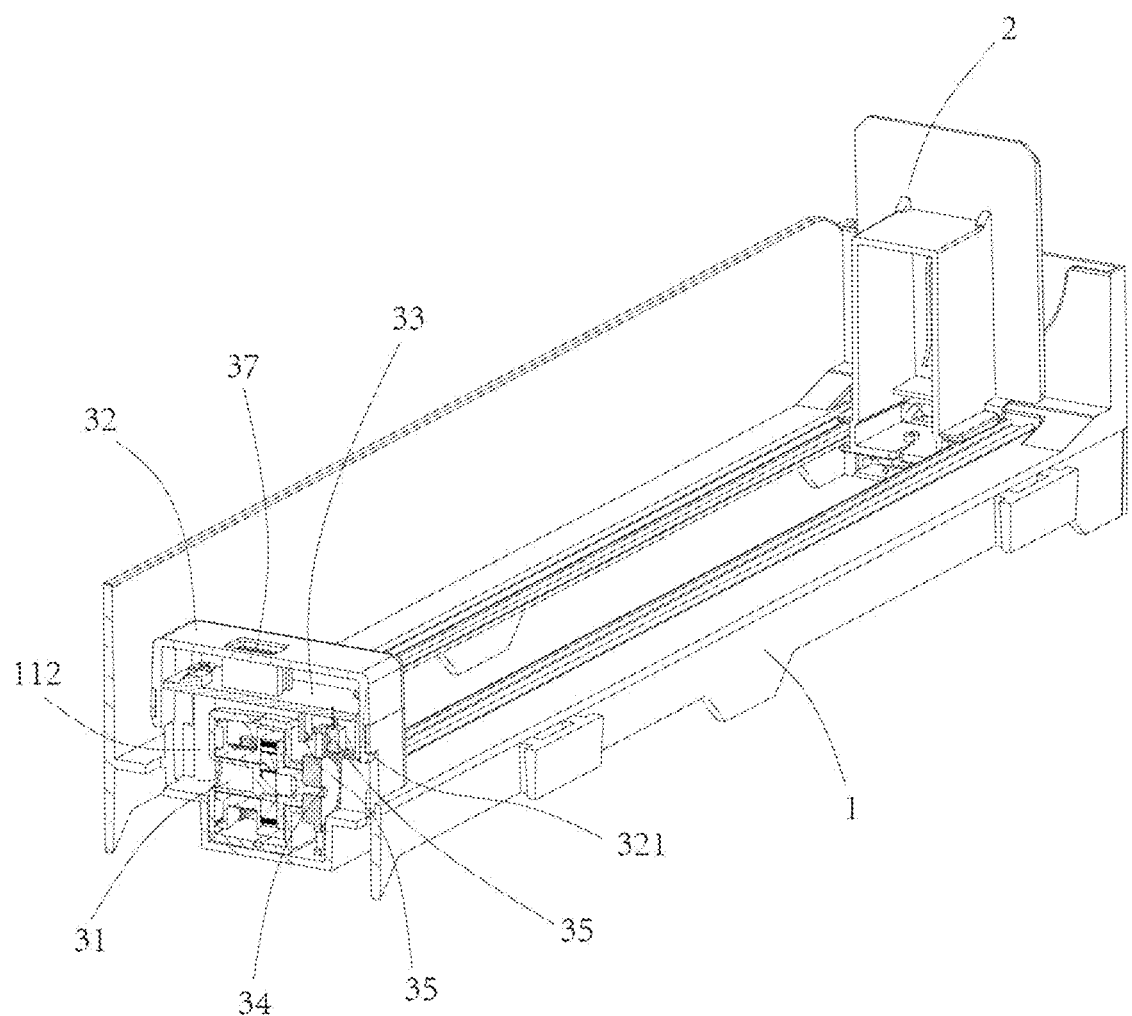
FIG. 3 is a sectional view of the article counting and propelling apparatus according to the utility model in FIG. 1.

Referring to FIG. 1 to FIG. 3, the utility model provides an article counting and propelling apparatus 100, including a base 1, a propelling plate 2 and a counting structure 3. The base 1 is shaped like a rectangular plate, the counting structure 3 is arranged at an end of the base 1, the propelling plate 2 is movably arranged on the base 1, and the counting structure 3 can control the propelling plate 2 to slide and push along the base 1, so that articles can be pushed out in an axial direction of the base 1.

More specifically, referring to FIG. 2 and FIG. 3, the counting structure 3 includes a shell 31, a cover body 32, a PCB board 33, a runner assembly 34 and counting sensing pieces 35; the runner assembly 34 is arranged on the shell 31 and is connected to the propelling plate 2 through a wire 4; and the runner assembly 34 includes a turnplate, a fixed base, a rotating shaft and the like, belonging to the conventional arrangement of the runner assembly, which can be obtained by those skilled in the art through the prior art and drawings, so the details are not elaborated in this embodiment. The base 1 is provided with an accommodating groove 11, the runner assembly 34 and the shell 31 are arranged in the accommodating groove 11, the counting sensing pieces 35 are arranged on the PCB board 33, the PCB board 33 and the cover body 32 are arranged above the accommodating groove 11, the cover body 32 closes the accommodating groove 11, and the counting sensing pieces 35 are arranged above or on two sides of the runner assembly 34. The shell 31, the runner assembly 34 and the counting sensing pieces 35 in the counting structure 3 are accommodated together through the accommodating groove 11, the PCB board 33 covers a part above the accommodating groove 11 for closing, and then the cover body 32 is mounted to combine the whole counting structure 3 and the base 1 into a whole body. The structure is simple in appearance, and the structure is simple and convenient to assemble.

More specifically, referring to FIG. 2 and FIG. 3, the counting sensing pieces 35 are grating sensors, the counting sensing pieces 35 are arranged on two sides of the runner assembly 34, and the runner assembly 34 passes through the grating sensors when rotating. The rotation of the runner assembly can be accurately recorded and the number of the remaining articles can be obtained through the grating sensors. The specific structures of the grating sensors belong to the choice of those skilled in the art according to the prior art and in combination with this embodiment, so the specific structures are not elaborated herein.

More specifically, referring to FIG. 1 and FIG. 3, a display board 37 is arranged on the cover body 32, and the display board 37 is connected to the PCB board 33. Compared with the arrangement of the display board on the base close to a side of the propelling plate 2, the arrangement of the display board 37 on the cover body 32 can reduce a distance between the display board 37 and the counting sensing pieces 35, thereby reducing materials required by mounting and facilitating display.

More specifically, referring to FIG. 2 and FIG. 3, a buckle 321 is arranged on the cover body 32, a groove wall of the accommodating groove 11 is provided with a clamping hole 111, and the buckle 321 is inserted into the clamping hole 111 when the cover body 32 is arranged on the base 1. The cooperation of the buckle 321 and the clamping hole 111 facilitates the insertion and disassembling of the cover body 32 and the base 1. More specifically, a plurality of mounting columns 112 are arranged in the accommodating groove 11, and the PCB board 33 is fixed on the mounting columns 112, so that the PCB board 33 can close the accommodating groove 11 conveniently, and the structure can be integrated.

According to the utility model, the propelling plate 2 is controlled by the counting structure 3 to slide and push articles along the base 1, and the number of the remaining articles can be sensed and counted by the counting sensing pieces 35, so that the number of the remaining articles can be displayed on the cover body 32 at an upper end of the counting structure 3 in time. The counting structure of the utility model is simple, convenient to operate and display, and convenient to visually see the number of the remaining articles.

Embodiment 2

Figure 4:
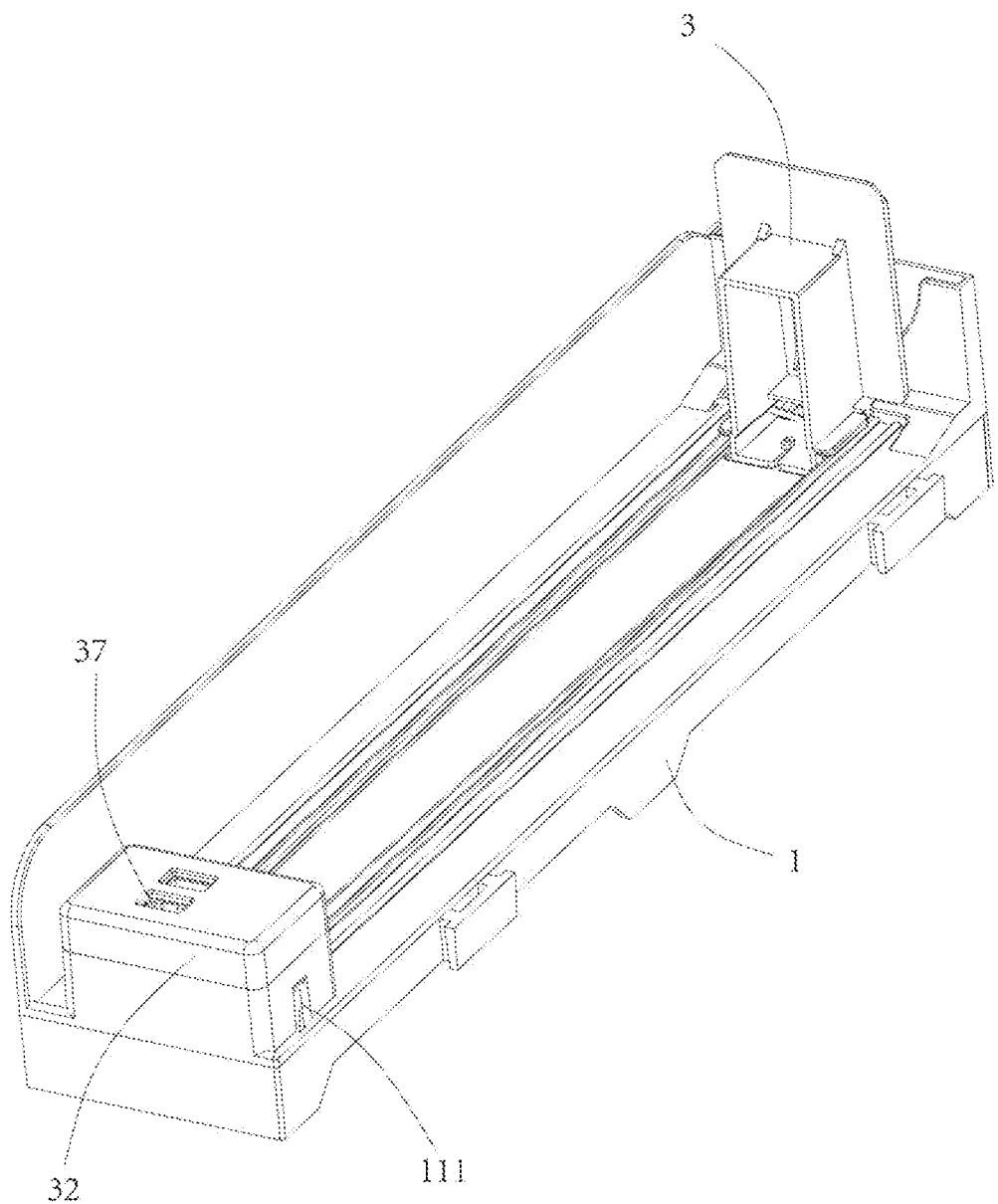
FIG. 4 is a schematic structural diagram of an article counting and propelling apparatus according to Embodiment 2 of the utility model.
Figure 5:
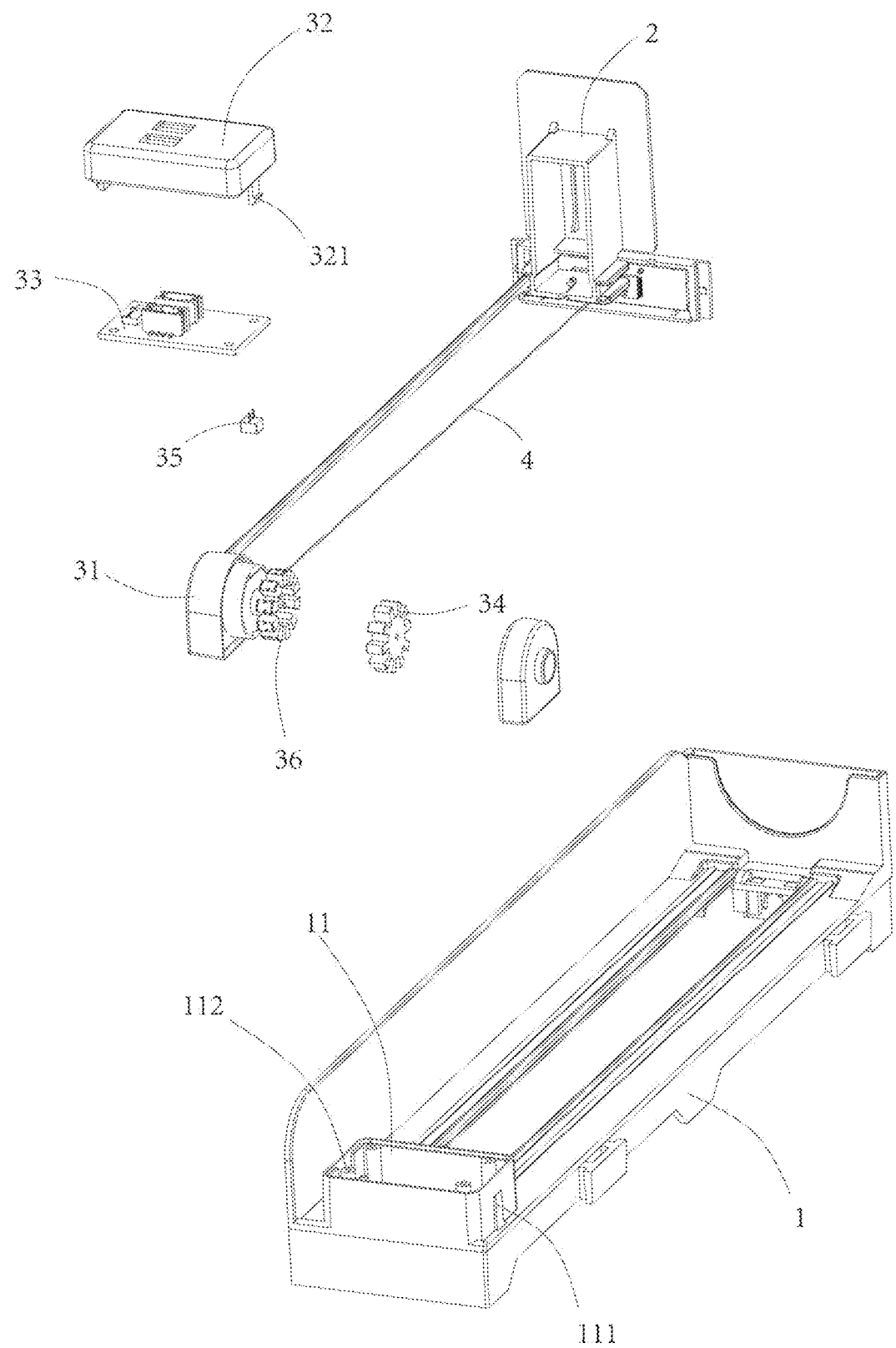
FIG. 5 is a schematic diagram of a breakdown structure of the article counting and propelling apparatus according to the utility model in FIG. 4.
Figure 6:
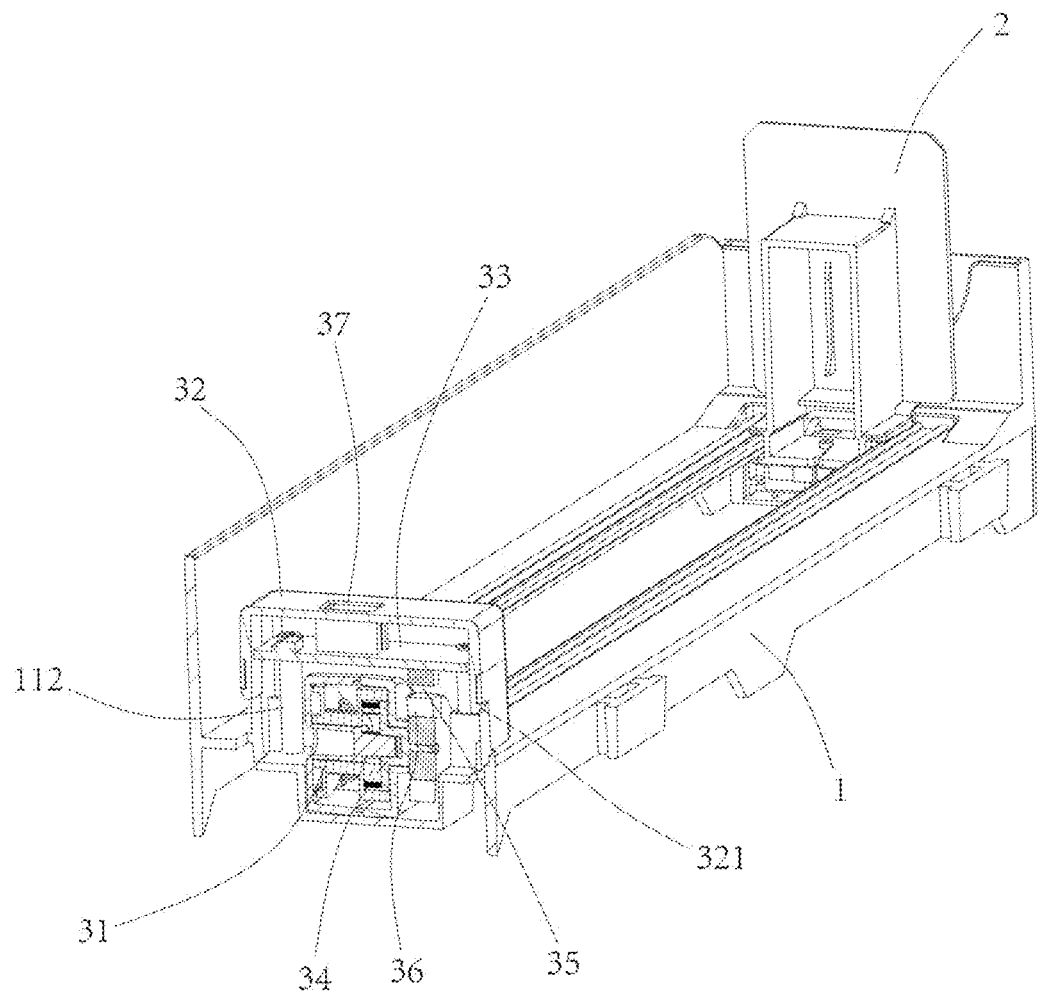
FIG. 6 is a sectional view of the article counting and propelling apparatus according to the utility model in FIG. 4.

Referring to FIG. 4 to FIG. 6, the utility model provides an article counting and propelling apparatus 100. The structure is similar to that of Embodiment 1, but the difference lies in the runner assembly 34 and the counting sensing pieces 35. The counting sensing pieces 35 are magnetic grating sensors, a plurality of magnetic pieces 36 are arranged on the runner assembly 34, the plurality of magnetic pieces 36 are arranged on the runner assembly 34 in a circular array, the counting sensing pieces 35 are arranged on the runner assembly 34, and the runner assembly 34 passes through the magnetic grating sensors above when rotating, so that the magnetic grating sensors can sense the magnetic pieces 36 for counting.

Technical features of the foregoing embodiments may be randomly combined. To make description concise, not all possible combinations of the technical features in the foregoing embodiments are described. However, the combinations of these technical features shall be considered as falling within the scope recorded by this specification in a case that no conflict exists.

The above embodiments are merely illustrative of several implementation manners of the utility model, which are described specifically and in detail but which cannot be construed as a limitation to the patent scope of the utility model. It should be pointed out that several variations and improvements that all fall within the protection scope of the utility model may be made by those of ordinary skill in the art without departing from the conception of the utility model. Therefore, the patent protection scope of the utility model should be subject to the appended claims.

What is claimed is:

1. An article counting and propelling apparatus, characterized in that, comprising: a base, a propelling plate and a counting structure, wherein the counting structure is arranged at an end of the base, the propelling plate is movably arranged on the base, and the counting structure controls the propelling plate to slide and push along the base; the counting structure comprises a shell, a cover body, a PCB board, a runner assembly and counting sensing pieces; the runner assembly is arranged on the shell and is connected to the propelling plate through a wire; the base is provided with an accommodating groove; the runner assembly and the shell are arranged in the accommodating groove; the counting sensing pieces are arranged on the PCB board; the PCB board and the cover body is arranged above the accommodating groove; the cover body closes the accommodating groove; the counting sensing pieces are arranged above or on two sides of the runner assembly; and the counting sensing pieces are grating sensors or magnetic grating sensors.

2. The article counting and propelling apparatus according to claim 1, characterized in that, the counting sensing pieces are the grating sensors, the counting sensing pieces are arranged on two sides of the runner assembly, and the runner assembly passes through the grating sensor when rotating.

3. The article counting and propelling apparatus according to claim 1, characterized in that, the counting sensing pieces are the magnetic grating sensors, a plurality of magnetic pieces are arranged on the runner assembly, the counting sensing pieces are arranged above the runner assembly, and the runner assembly passes through the magnetic grating sensors above when rotating.

4. The article counting and propelling apparatus according to claim 1, characterized in that, a display board is arranged on the cover body, and the display board is connected to the PCB board.

5. The article counting and propelling apparatus according to claim 1, characterized in that, a buckle is arranged on the cover body, a groove wall of the accommodating groove is provided with a clamping hole, and the buckle is inserted into the clamping hole when the cover body is arranged on the base.

6. The article counting and propelling apparatus according to claim 1, characterized in that, a plurality of mounting columns are arranged in the accommodating groove, and the PCB board is fixed on the mounting columns.

* * * * *